| (12) United States Patent
Ammitzbøll et al. | (10) Patent No.: US 6,785,294 B1
(45) Date of Patent: Aug. 31, 2004 |
|---|---|

(54) METHODS AND APPARATUSES FOR SUPPORTING IGMP AND GMRP CONCURRENTLY

(75) Inventors: Benny Lønstrup Ammitzbøll, Vaerloese (DK); Anders Christensen, Herlev (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,831

(22) Filed: Dec. 30, 1999

(51) Int. Cl.[7] .............................. H04J 3/16; G06F 15/16
(52) U.S. Cl. .................. 370/467; 370/392; 370/395.52; 370/471; 709/230; 709/238
(58) Field of Search ........................... 709/221, 200, 709/206, 220, 222, 230, 238, 245; 370/395.52, 389, 390, 392, 395.53–395.54, 465–467, 546, 395.1, 395.21, 396, 469, 471

(56) References Cited

U.S. PATENT DOCUMENTS

| 6,157,641 | A | * | 12/2000 | Wilford | 370/389 |
| 6,321,270 | B1 | * | 11/2001 | Crawley | 709/238 |
| 6,483,832 | B1 | * | 11/2002 | Civanlar et al. | 370/390 |
| 6,483,842 | B1 | * | 11/2002 | Mauger | 370/420 |
| 6,493,345 | B1 | * | 12/2002 | Margulis et al. | 370/395.53 |
| 2002/0186694 | A1 | * | 12/2002 | Mahajan et al. | 370/390 |

OTHER PUBLICATIONS

"Virtual Bridged Local Area Networks," Draft Standard P802.1Q/D11 IEEE Standards for Local and Metropolitan Area Networks, Jul. 30, 1998, pp. 1–213.

Information technology—Telecommunications and information exchange between systems—Local and metropolitan area networks—Common specifications—Part 2: Media Access Control (MAC) Bridges: Revision. IEEE P803.1D/D15, Nov. 24, 1997, pp. 1–381.

* cited by examiner

Primary Examiner—Afsar Qureshi
(74) Attorney, Agent, or Firm—Blakely, Sokoloff, Taylor & Zafman LLP (57) ABSTRACT

Methods and apparatuses for supporting both Internet Group Management Protocol (IGMP) and GARP (Generic Attribute Registration Protocol) Multicast Registration Protocol (GMRP) multicast registration concurrently are disclosed. IGMP registrations are processed by one or more network routers. The IGMP registrations are passed to one or more switches and processed by the one or more switches as GMRP static registrations.

10 Claims, 3 Drawing Sheets

METHODS AND APPARATUSES FOR SUPPORTING IGMP AND GMRP CONCURRENTLY

FIELD OF THE INVENTION

The invention relates to networked devices. More particularly, the invention relates to providing multicast capability with both Internet Group Management Protocol (IGMP) and Group Multicast Registration Protocol (GMRP).

BACKGROUND OF THE INVENTION

Multicasting of network traffic is communication between a single sender and multiple receivers on the network. Typical uses include the updating of mobile personnel from a home office and the periodic issuance of online newsletters. Internet Group Management Protocol (IGMP) can be used for multicasting. One embodiment of IGMP is described in the Internet Engineering Task Force (IETF) Request for Comments (RFC) 1112, published in August 1989.

IGMP is a layer 3 (network layer) protocol, which means that IGMP methods are used to control multicast traffic with network routers. Routers direct multicast traffic to switches having nodes that are intended to receive the multicast traffic. However, as multicast traffic increases additional pruning is desirable at the switch level (layer 2) in order to more efficiently use available switch bandwidth. IGMP has been applied to switches to provide additional pruning, but because IGMP is a layer 3 protocol, such IGMP-based layer 2 pruning is inefficient.

The Institute of Electronics and Electrical Engineers (IEEE) standard 801.2D/D15, published Nov. 24, 1997 describes the Generic Attribute Registration Protocol (GARP), which is a layer 2 protocol. The GARP Multicast Registration Protocol (GMRP) can be used for multicast pruning at the switch (layer 2) level. GMRP provides improved pruning performance compared to IGMP. However, switching multicast pruning from a layer 3 protocol to a layer 2 protocol is expensive because both switches and routers must be upgraded.

SUMMARY OF THE INVENTION

A first set of multicast registrations is processed according to a first network protocol. A second set of multicast registrations is processed according to a second network protocol. The first set of multicast registrations are received and processed as a predetermined type of multicast registrations according to the second network protocol.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

Methods and apparatuses for supporting IGMP and GMRP concurrently in a are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatuses for performing the operations herein. These apparatuses may be specially constructed for the required purposes, or may comprise a general purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Methods and apparatuses for supporting both Internet Group Management Protocol (IGMP) and GARP (Generic Attribute Registration Protocol) Multicast Registration Protocol (GMRP) multicast registration concurrently are disclosed. IGMP registrations are processed by one or more network routers. The IGMP registrations are passed to one or more switches and processed by the one or more switches as GMRP static registrations.

Figure 1:
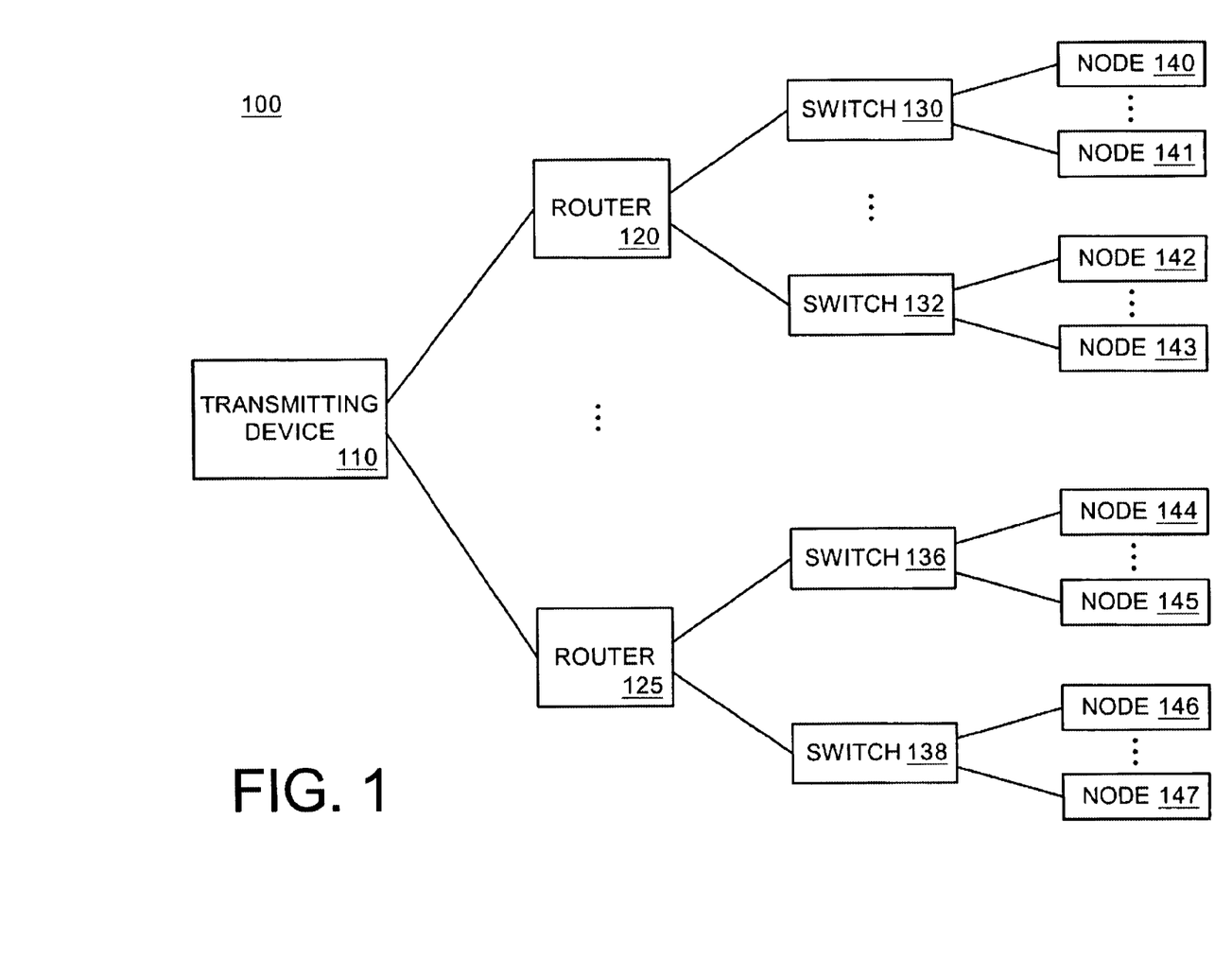
FIG. 1 is a block diagram of a network architecture in which data can be multicast from a transmitting device to one or more receiving nodes.

FIG. 1 is a block diagram of a network architecture in which data can be multicast from a transmitting device to one or more receiving nodes. Transmitting device 110 transmits information (e.g., audio and/or video data, text data) to a subset of nodes coupled with transmitting device 110. Transmitting device can be, for example, a server computer system that provides audio/video programming to subscribed nodes.

Multiple routers such as, for example, routers 120 and 125 are coupled with transmitting device 110. Any number of routers can be coupled with transmitting device 110. In one embodiment, routers 120 and 125 provide IGMP multicast registration support.

The routers determine whether one or more attached switches have nodes that have registered to receive multicast traffic from transmitting device 110. If so, the router forwards the appropriate multicast traffic to the switch. Otherwise, multicast traffic is not forwarded. For example, if nodes 140, 142 and 147 are registered to receive multicast traffic from transmitting device 110, router 120 forwards the multicast traffic to switches 130 and 132 and router 125 forwards the multicast traffic to switch 138, but not to switch 136.

In one embodiment, one or more of switches 130, 132, 136 and 138 process multicast registrations according to the GMRP, which allows end stations (e.g., bridges, switches) to dynamically register and de-register group membership information with bridges associated with a particular network (e.g., local area network). The information is distributed to all bridges coupled with the network that support Extended Filtering Services as defined by IEEE Std. 802.1D. The information that can be registered includes: 1) group membership information and 2) group service requirement information.

Group membership information indicates that one or more GMRP participants that are members of a particular group exist, and carries the group MAC address(es) for the group (s). The exchange of group membership information can result in the creation or updating of Group Registration Entries in the Filtering Database to indicate the ports(s) that correspond to particular group(s). In one embodiment, IGMP multicast registrations are processed as static GMRP registrations. Switches 130, 132 and 138 forward the multicast traffic to nodes 140, 142 and 147, respectively. Nodes 141, 143, 144, 145 and 146 do not receive the multicast traffic.

Providing both GMRP and IGMP pruning requires control over potentially the same multicast filter database entries within a switch for both protocols. In order to provide control for both protocols, a common entry point for handling multicast registrations is provided. Because GMRP handles static and dynamic registration, GMRP can be used to provide the entry point. In one embodiment, IGMP pruning registrations are handled as special case static GMRP registrations.

In one embodiment, the precedence of multicast registrations for a given group MAC address on a given port and VLAN is as follows, from highest to lowest precedence:

1. Static information;
2. Dynamic IGMP registration;
3. Dynamic GMRP registration; and
4. Default behavior.

IGMP pruning registrations have higher priority GMRP because IGMP punning operates a higher network layer, but lower than static defined information (e.g., rules provided by a network administrator).

| "forward all"/"forward unregistered" group MAC address registration for a specific VLAN and port | | GMRP global enabled | | GMRP global disabled |
|---|---|---|---|---|
| | | GMRP enabled for this port | GMRP disabled for this port | — |
| IGMP pruning global enabled | IGMP pruning enabled for this port | 1. Static fixed=FORWARD<br>2. Static forbidden=FILTER<br>3. IGMP fixed=FORWARD<br>4. Default=FILTER | 1. Static fixed=FORWARD<br>2. Static forbidden=FILTER<br>3. IGMP fixed=FORWARD<br>4. Default=FILTER | 1. Static fixed=FORWARD<br>2. Static forbidden=FILTER<br>3. IGMP fixed=FORWARD<br>4. Default=FILTER |
| | IGMP pruning disabled for this port | 1. Static fixed=FORWARD<br>2. Static forbidden=FILTER<br>3. GMRP dynamic=FORWARD<br>4. Default=FILTER | 1. Static fixed=FORWARD<br>2. Static forbidden=FILTER<br>3. Default=FORWARD | 1. Static fixed=FORWARD<br>2. Static forbidden=FILTER<br>3. Default=FORWARD |
| IGMP pruning global disabled | — | 1. Static fixed=FORWARD<br>2. Static forbidden=FILTER<br>3. GMRP dynamic=FORWARD<br>4. Default=FILTER | 1. Static fixed=FORWARD<br>2. Static forbidden=FILTER<br>3. Default=FORWARD | 1. Static fixed=FORWARD<br>2. Static forbidden=FILTER<br>3. Default=FORWARD |

Both IGMP pruning configuration and GMRP configuration is assumed to take place on a per port basis (enable/disable) as well as on a global basis (enable/disable). The following table describes the effect if IGMP pruning on "forward all" and "forward unregistered" group MAC addresses. In one embodiment, GMRP and underlying GARP are implemented according to IEEE Std. 802.1D/D15; however, alternative implementations can also be used.

In one embodiment, memory use is modified as compared to IEEE Std. 802.1D/D15. The modifications are described below. IEEE Std. 802.1D/D15 defines the following interface function:

```
/* attribute management control: */
void gid_manage_attribute(Gid *my_port, unsigned index, Gid_event directive);
/* return True if the Registrar is not Empty, or if Registration is fixed: */
Boolean gid_registered_here(Gid *my_port, unsigned gid_index);
```

In the modified embodiment, the following interface function is used:

```
/* attribute management control: */
void gid_manage_attribute(UNIT16 portNo, t_garpAttributeEntry
*attributeRef, Gid_event directive);
/* Returns True if the Registrar is not Empty, or if Registration is fixed */
BOOL gid_manage_here(UNIT16 portNo, t_garpAttributeEntry
*attributeRef);
```

The gid_manage_attribute function is used to control the management registration state of a given GARP attribute on a given port (e.g., to set up configured static registrations for the attribute). GMRP defines an attribute as a group MAC address in a VLAN. In the IEEE Standard-based embodiment, the "port" parameter is a pointer to a Gid structure and the attribute parameter is an index. In the modified embodiment, the port parameter is an integer and the attribute parameter is a pointer to an attribute structure that is shown below:

```
typedef  struct t_garpAttributeEntry_{
t_garpAttributeEntry_         *nextInContext;
Gid_machine                   gidMachine[MAX_PORTS];
BYTE                          gipCounter;
BYTE                          reserved;
BYTE                          applicationInfo[2];
} t_garpAttributeEntry;
```

Protocols based on GARP, for example, GMRP can expand the attribute structure. For the modified embodiment, the following attribute structure is used:

```
typedef  struct t_garpAttributeEntry_{
BYTE                  macAddr[6];
UNIT16                vlanId;
BYTE                  igmpInUse[PORT_MASK_BYTE_SIZE];
BYTE                  igmpFixReg[PORT_MASK_BYTE_SIZE];
BYTE                  staticFixReg[PORT_MASK_BYTE_SIZE];
BYTE                  staticForbidReg[PORT_MASK_BYTE_
                      SIZE];
t_garpAttributeEntry_  *garpAttrEntryPtr;
} t_garpAttributeEntry;
``` to form a fixed size attribute table:

t_gmrpAttrEntry gmrpAttrTable[GMRP_MAX_ATTRIBUTES];

In other words, the modified GMRP embodiment keeps track of registered multicast group MAC addresses in a fixed size attribute database that stores the group MAC address, tagged VLAN identifier (context) and a pointer to GARP information (gid machines, etc.). The pointer is provided by the modified GMRP code when creating a new entry in the database and is used to refer to the corresponding state machine(s), etc. when performing function calls. In one embodiment, for each entry in the attribute table specific IGMP pruning fields exist.

In one embodiment, two special registrations are possible: the "all group addresses" and "unregistered group addresses." This is represented with the keys (GMRP_ALL_GROUP_MAC, VLAN_ID) and (GMRP_UNREG_GROUP_MAC, VLAN_ID) in the attribute table shown below. An empty entry has the key (0, 0).

const BYTE GMRP_ALL_GROUP_MAC[6]={0, 0, 0, 0, 0, 1};

const BYTE GMRP_UNREG_GROUP_MAC[6]={0, 0, 0, 0, 0, 2}

In one embodiment, entries in the table array gmrpAttrTable above are sorted by (macAddr, vlanId) to support binary searching. However, in call-backs from GARP the garpAttributeEntry pointer is given as a parameter and can be used to look up the attribute directly.

The igmpInUse mask in the structure t_gmrpAttrEntry is used to time out IGMP registrations after a configurable timeout period. The igmpFixReg masks are used to store the registration state of IGMP pruning (in case of a static registration is removed the IGMP pruning registration takes effect). The staticFixReg mask has a bit set for each port where (group MAC, VLAN ID) has a static fixed registration and the staticForbidReg mask has a bit set for each port where (group MAC, VLAN ID) has a static forbidden registration. When no bit is set in either of the masks a "static don't care" condition exists.

Because IGMP registrations are handled as static GMRP registrations, both layer 2 and layer 3 protocols can be simultaneously supported. The IGMP registration state (e.g., fixed, don't care) is stored internally by GMRP in case a static registration disappears. IGMP registrations are not propagated via GMRP to other GMRP aware devices. The propagation of the registration is done by IGMP pruning to other IGMP aware devices. The following set of functions are used for IGMP registration, de-registration and time out:

```
*/ This function is used to set IGMP registration state of this group */
*/ MAC in this VLAN on this port to "fixed."                          */
/* Parameters: macaddr (IN) MAC address, vlanId (IN) tag VLAN         */
/*   ID, portNo (IN) port number                                      */
/*   macaddr == NULL means "all group registration                    */
/*   for this vlanId on this port" (IP multicast router)              */
/* Return value: True - registration succeeded                        */
/*   False - registration did not succeed                             */ extern BOOL GmrpIgmpFixReg(BYTE *macaddr, UNIT16 vlanId, UNIT16 portNo);
```

```
/* This function is used to clear the inUse bit for an IGMP regi-     */
/* stration for this group MAC in this VLAN on this port              */
/* Parameters: macaddr (IN) MAC address, vlanId (IN) tag VLAN         */
/*   ID, portNo (IN) port number                                      */
/*   macaddr == NULL means "all group registration                    */
/*   for this vlanId on this port" (IP multicast router)              */
/* Return value: True - succeeded                                     */
/*   False - did not succeed                                          */
``` extern BOOL GmrpIgmpRemoveReg(BYTE *macaddr, UNIT16 vlanId, UNIT16 portNo0:

```
/* This function is used to inform GMRP of the IGMP        */
/* configuration state global and port state               */
/* Parameters: globalEnabled (IN) Global IGMP pruning state, */
/*   portNo (IN) port number                               */
/*   portEnabled (IN) IGMP pruning port state              */
``` extern void GmrpIgmpConfig(BOOL globalEnabled, UNIT16 portNo, BOOL portEnabled);

```
/* This function times out IGMP registrations that no longer have */
/* their inUse bit set and clear all other inUse bits             */
/* Parameters: vlanId (IN) tag VLAN ID for which to time out      */
``` extern void GmrpIgmpUpdateAlive(UNIT16 vlanId);

The following pseudo-code describes one embodiment of the four functions outlines above.

```
void   GmrpIgmpUpdateAlive(UNIT16 vlandId)
{
   for(index: all entries in gmrpAttrTable)
      if (gmrpAttrTable entry is in use && entry.vlanId == vlanId)
         for(portNo: all port)
         {
         /* Test if registration is in use */
         if(TSTBIT(gmrpAttrTable[index].igmpInUse,portNo))
            CLRBIT(gmrpAttrTable[index].igmpFixReg,portNo);
         else
         {/* No, registration has timed out, remove from table */
            CLRBIT(gmrpAttrTable[index].igmpFixReg,portNo);
            /* Any static registration? */
            if(!TSTBIT(gmrpAttrTable[index].staticFixReg,
               portNo) &&
               !TSTBIT(gmrpAttrTable[index].staticForbidReg,
               portNo))
               {/* No, set state to normal */
                  gid_manage_attribut(portNo,
                  gmrpAttrTable[index].garpAttrEntryPtr,
                     Gid_normal_registration);
               }
            }
         }
      }
/* Array to hold information about IGMP pruning configuration */
static Gid_event    gmrpIgmpConfig[MAX_PORTS];
static void    GmrpUpdateDefaultMCMask(UNIT16 vlanId, UNIT16
portNo,
    t_gmrpAttrEntry *gmrpForwardAll,
    t_gmrpAttrEntry *gmrpForwardUnreg)
{
   BOOL   defaultForwardReg;
   BOOL   defaultFilterReg;
   BOOL   isForward;
   UNIT 16   i;
if((gmrpForwardAll && GarpGidRegisteredHere(portNo,
gmrpForwardAll->
   garpAttrEntryPtr)) || (gmrpForwardUnreg &&
   GarpGidRegisteredHere(portNo, gmrpForwardUnreg->
   garpAttrEntryPtr)))
{
   /* registration state is forward_by_default (static/dynamic) */
   defaultForwardReg = TRUE;
   defaultFilterReg = FALSE;
}
else if((gmrpForwardAll && TSTBIT(gmrpForwardAll ->
   staticForbidReg, portNo)) || (gmrpForwardUnreg && TSTBIT
   (gmrpForwardUnreg->staticForbidReg, portNo)))
```

-continued

```
{
   /* registration state is filter_by_default (static) */
   defaultForwarReg = FALSE;
   defaultFilterReg = TRUE;
}
else
{
   /* no default registration state */
   defaultForwardReg = FALSE;
   defaultFilterReg = TRUE;
}
if(gmrpIgmpConfig[portNo] == Gid_forbid_registration)
{
   /* IGMP pruning is global enabled and enabled on this port */
   /* GMRP configuration is don't care */
   if(defaultForwardReg && ((gmrpForwardAll &&
   (TSTBIT(gmrpForwardAll->igmpFixReg, portNo) ||
   TESTBIT(gmrpForwardAll->staticFixReg, PortNo))) ||
   (gmrpForwardUnreg && TSTBIT(gmrpForwardUnref->staticFixReg,
      portNo))))
   {
   /* Someone wants forward_by_default in this vlan on this port */
   /* even though IGMP pruning is enabled */
   /* Could be because of a static forward all/unreg. entry */
   /* or because an IP multicast router is present on this port */
   /* in this vlan - in these cases allow forwarding */
   /* (but do not allow forwarding if registration is dynamic) */
      isForward = TRUE;
      fdb_forward_by_default(vlanId, portNo);
   }
   else
   {
      isForward = FALSE;
      fdb_filter_by_default(vlanId, portNo);
   }
}
else
/* IGMP pruning is disables on this port */
/* then GMRP configuration rules */
if(gmrpGlobalEnabled)
{
   if(gmrp)Enabled[portNo] && !defaultForwardReg)
   {
      isForward = FALSE;
      fdb_filter_by_default(vlanId, portNo);
   }
   else
   {
      isForward = TRUE;
      fdb_filter_by_default(vlanId, portNo);
   }
}
else if(defaultForwardReg)
{
   isForward = TRUE;
   fdb_forward_by_default(vlanId, portNo);
}
else if(defaultFilterReg)
{
   isForward = FALSE;
   fdb_filter_by_default(vlanId, portNo);
}
else
{
   /* absolute default. No GMRP, no IGMP pruning and no */
   /* static configuration. Default is FORWARD */
   isForward = TRUE;
   fdb_forward_by_default(vlanId, portNo);
}
}
/* walk the specific group MACs in the attribute table */
for(i: specific group MACs)
```

-continued

```
{
  if(gmrpAttrTable.table[i].vlanId == vlanId)
  {
    /* this entry is in the right context */
    if(!TSTBIT(gmrpAttrTable.table[i].staticFixedReg, portNo) &&
       !TSTBIT(gmrpAttrTable.table[i].staticForbidReg, portNo)
       && !GarpGidRegisteredHere(portNo,
       gmrpAttrTable.table[i].garpAttrEntryPtr))
    {
      /* no registrations */
      BYTE *macAddr;
      macAddr = gmrpAttrTable.table[i].macAddr;
      if(isForward)
          fdb_forward(vlanId, portNo, macAddr);
      else
          fdb_filter(vlanId, portno, macAddr);
    }
  }
}}
void GmrpIgmpConfig(BOOL globalEnabled, UNIT16 portNo, BOOL
portEnabled);
{
  e_gidEvent     directive;
  t_gmrpAttrEntry   *gmrpForwardAll;
  t_gmrpAttrEntry   *gmrpForwardUnreg;
  UNIT16    vlanId;
  if(globalEnabled)
  {
    if(portEnabled)
        directive = Gid_forbid_registration;
    else
        directive = Gid_fix_registration;
  }
  else
    directive = Gid_normal_registration;
  gmrpIgmpConfig[portNo] = directive;
  for(vlanId; active VLANs)
  {
    gmrpForwardAll =
        GmrpAttrLookup(GMRP_ALL_GROUP_MAC, vlanId);
    gmrpForwardUnreg =
        GmrpAttrLookup(GMRP_UNREG_GROUP_MAC, vlanId);
    GmrpUpdateDefaultMCMask(vlanId, portNo, gmrpForwardAll,
        gmrpForwardUnreg);
  }
}
static BOOL GmrpIgmpReg(BYTE *macAddr, UNIT16 vlanId, UNIT16
        portNo, Gid_event directive);
{
  t_garpAttributeEntry *garpAttrEntryPtr;
  t_gmrpAttrEntry    *gmrpAttrEntryPtr;
  if(macAddr == NULL)    /* all group reg. in vlanId */
    macAddr = GMRP_ALL_GROUP_MAC;
  gmrpAttrEntryPtr = GmrpAttrLookupInsert(macAddr, vlanId);
  if(gmrpAttrEntryPtr)
  {  /* adjust attribute entry to reflect new registration state */
    if(directive == Gid_fix_registration)
    {
      SETBIT(gmrpAttrEntryPtr->igmpFixReg, portNo);
      SETBIT(gmrpAttrEntryPtr->igmpInUse, portNo);
    }
    else   /* Gid_normal_registration */
      CLRBIT(gmrpAttrEntryPtr->igmpInUse, portNo);
    /* adjust GARP registration if no static registration exists */
    if(!TSTBIT(gmrpAttrEntryPtr->staticFixReg, portNo) &&
       !TSTBIT(gmrpAttrEntryPtr->staticForbitReg, portNo))
    {
      garpAttrEntryPtr = gmrpAttrEntryPtr->garpAttrEntryPtr;
      gid_manage_attribute(portNo, garpAttrEntryPtr, directive);
    }
  }
  else
    return FALSE /* table is full, could not register */
  return TRUE
}
```

```
BOOL GmrpIgmpFixReg(BYTE *macAddr, UNIT16 vlanId, UNIT16
portNo);
{
  return GmrpIgmpReg(macAddr, vlanId, portNo, Gid_fix_registration);
}
BOOL GmrpIgmpRemoveReg(BYTE *macAddr, UNIT16 vlanId,
UNIT16 portNo);
{
  return GmrpIgmpReg(macAddr, vlanId, portNo, Gid_normal_
     registration);
}
```

The following pseudo-code describes one embodiment, of IGMP pruning using the GMRP interface set forth above. The following function (pruningOn) provides IGMP pruning at the switch level.

```
BOOL pruningOn[MAX_PORTS]; /* per port configuration status */
/* IGMP packet received (query, join, leave, DVMRP probe) */
if(!(packet fields checks ok))
{
  /* illegal packet received */
  free packet;
  return;
}
/* Note: packet.portNo is the port number the packet was received on */
switch(packet.type)
{
case IGMP_QUERY:
   if(!pruningTimerRunning)
      startPruningTimer(pruningTimerValue);
   /* fall through */
case DVMRP_PROBE:
   if(pruningOn[packet.portNo])
   {
     /* these are treated like a fixed registration in all groups on */
     /* one VLAN */
     GmrpIgmpFixReg(NULL, packet. vlanId, packet.portNo);
     /* the registration is timed out later if not kept alive */
   }
   break;
case IGMP_REPORT:
   if(pruningOn[packet.portNo])
      GmrpIgmpFixReg(packet.destmac, packet.vlanId, packet.portNo);
      /* the registration is timed out later if not kept alive */
   break;
case IGMP_LEAVE:
   if(pruningOn[packet.portNo])
      GmrpIgmpRemoveReg(packet.destmac, packet.vlanId,
         pakcet.portNo);
   break;
default:
   /* unknown IGMP packet received */
   generate log or similar;
   break;
}
free packet;
return;
```

The following function can be used for pruning reconfigurations.

```
static   void   Read_Configuration(void)
{
  BOOL   pruningWasOn;
  pruningTimerValue = igmpParms.pruiningTimer;
  if(igmpParms.pruningOn == IGMP_ENABLED)
     /* IGMP global pruning enabled? */
```

-continued

```
{
  for(portNo: all ports) /* check per port enable/disable status */
  {
    pruningWasOn = pruningOn[portNo];
    pruningOn[portNo] =
    (igmpParms.table[portNo].pruningOn == IGMP_ENABLED);
    if(pruningOn[portNo] && !pruningWasOn)
      GrmpIgmpConfig(TRUE, portNo, TRUE);
    else if(!pruningOn[portNo] && pruningWasOn)
      GmrpIgmpConfig(TRUE, portNo, FALSE);
  }
}
else   /* IGMP pruning global disabled */
{
  for(portNo: all ports)
  {
    if(pruningOn[portNo])
    {
      pruningOn[portNo] = FALSE;
      GmrpIgmpConfig(FALSE, portNo, FALSE);
    }
  }
}}
```

Figure 2:
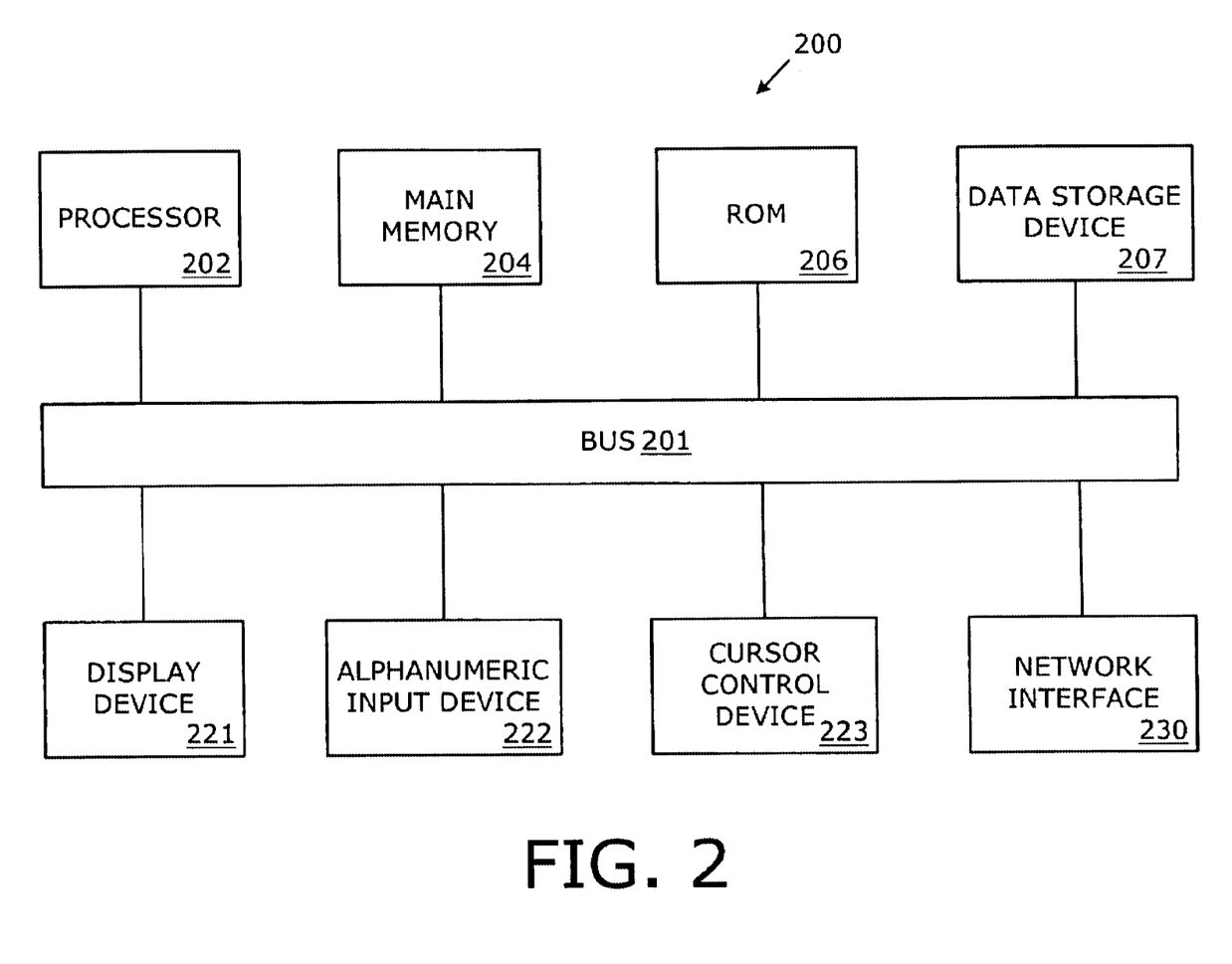
FIG. 2 is an electronic system suitable for use as a transmitting device and or a node that receives multicast traffic.

FIG. 2 is an electronic system suitable for use as a transmitting device and or a node that receives multicast traffic. The electronic system illustrated in FIG. 2 is intended to represent a range of electronic systems. Alternative electronic systems can include more, fewer and/or different components.

Electronic system 200 includes bus 201 or other communication device to communicate information, and processor 202 coupled to bus 201 to process information. While electronic system 200 is illustrated with a single processor, electronic system 200 can include multiple processors and/or co-processors. Electronic system 200 further includes random access memory (RAM) or other dynamic storage device 204 (referred to as main memory), coupled to bus 201 to store information and instructions to be executed by processor 202. Main memory 204 also can be used to store temporary variables or other intermediate information during execution of instructions by processor 202.

Electronic system 200 also includes read only memory (ROM) and/or other static storage device 206 coupled to bus 201 to store static information and instructions for processor 202. Data storage device 207 is coupled to bus 201 to store information and instructions. Data storage device 207 such as a magnetic disk or optical disc and corresponding drive can be coupled to electronic system 200.

Electronic system 200 can also be coupled via bus 201 to display device 221, such as a cathode ray tube (CRT) or liquid crystal display (LCD), to display information to a computer user. Alphanumeric input device 222, including alphanumeric and other keys, is typically coupled to bus 201 to communicate information and command selections to processor 202. Another type of user input device is cursor control 223, such as a mouse, a trackball, or cursor direction keys to communicate direction information and command selections to processor 202 and to control cursor movement on display 221. Electronic system 200 further includes network interface 230 to provide access to a network, such as a local area network.

Instructions are provided to memory from a storage device, such as magnetic disk, a read-only memory (ROM) integrated circuit, CD-ROM, DVD, via a remote connection (e.g., over a network via network interface 230) that is either wired or wireless, etc. In alternative embodiments, hardwired circuitry can be used in place of or in combination with software instructions to implement the present invention. The present invention is not limited to any specific combination of hardware circuitry and software instructions.

Figure 3:
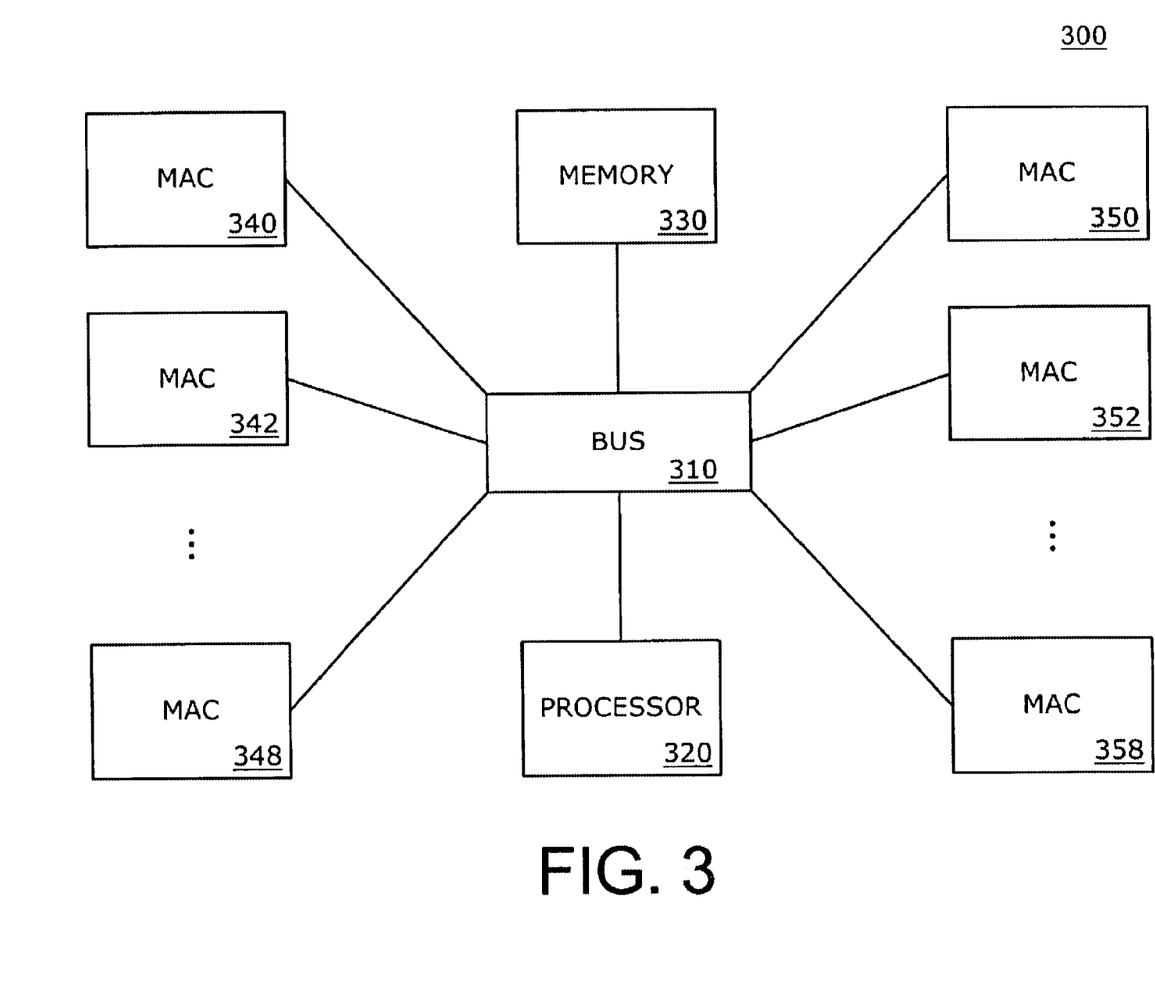
FIG. 3 is a block diagram of one embodiment of a basic hardware configuration suitable for use as a network switch or a network router.

FIG. 3 is a block diagram of one embodiment of a basic hardware configuration suitable for use as a network switch or a network router. In general, routers and switches are electronic systems coupled to networked devices to provide specific functions.

Routers are electronic systems that determines the next network point to which a packet should be forwarded toward the packet's destination. Routers are connected to at least two networks and decide which way to send each information packet based on the router's current understanding of the state of the networks it is connected to. Routers can be combined and can include additional components. A router creates or maintains a table of the available routes and their conditions and uses this information along with distance and cost algorithms to determine the best route for a given packet. Typically, a packet may travel through a number of network points with routers before arriving at its destination.

Switches are network devices that selects a path or circuit for sending a unit of data to its next destination. In general, a switch is a simpler and faster mechanism than a router, which requires knowledge about the network and how to determine the route. On larger networks, the trip from one switch point to another in the network is called a hop. Switches can be combined and can include additional components.

Router/switch 300 includes bus 310 or other communication device to communicate information, and processor 320 coupled to bus 310 to process information. While router/switch 300 is illustrated with a single processor, router/switch 300 can include multiple processors and/or co-processors. Router/switch 300 further includes memory 330, coupled to bus 310 to store information and instructions to be executed by processor 320. Memory 330 also can be used to store temporary variables or other intermediate information during execution of instructions by processor 320.

Router/switch 300 includes multiple media access controllers (MACs) (e.g., 340, 342, 348) that are coupled to input ports to receive packets of data from a network (not shown in FIG. 2). Packets of data received by the MACs are forwarded to memory 330. Memory 330 stores packets of data for processing and/or forwarding by router/switch 300.

Router/switch 300 also includes multiple MACs (e.g., 350, 352, 354) are coupled to memory 330 to receive packets to be forwarded through corresponding output ports. Packets are forwarded to other networked devices (e.g., nodes).

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   processing a first set of multicast registrations according to Internet Management Group Protocol (IMGP); and
   processing a second set of multicast registrations according to GARP (Generic Attribute Registration Protocol) Multicast Registration Protocol (GMRP), wherein static multicast registrations are processed with a highest priority, dynamic Internet Group Management Protocol (IGMP) multicast registrations are processed with a second highest priority, IGMP multicast registrations as static GMRP registrations are processed with a third highest priority and default registrations are processed with a fourth highest priority.

2. The method of claim 1 wherein the IGMP registrations are not propagated via GMRP to GMRP aware devices.

3. The method of claim 1 wherein IGMP configuration is performed on a per port basis as well as a global basis.

4. The method of claim 3 wherein GMRP configuration is performed on a per port basis as well as a global basis.

5. A machine-readable medium having stored thereon sequences of instructions that, when executed by one or more processors, cause one or more electronic systems to:

process a first set of multicast registrations according to Internet Group Management Protocol (IGMP); and process a second set of multicast registrations according to GARP (Generic Attribute Registration Protocol) Multicast Registration Protocol (GMRP), wherein static multicast registrations are processed with a highest priority, dynamic Internet Group Management Protocol (IGMP) multicast registrations are processed with a second highest priority, IGMP multicast registrations as static GMRP registrations are processed with a third highest priority and default registrations are processed with a fourth highest priority.

6. The machine-readable medium of claim 5 wherein the IGMP registrations are not propagated via GMRP to GMRP aware devices.

7. The machine-readable medium of claim 5 wherein IGMP configuration is performed on a per port basis as well as a global basis.

8. The machine-readable medium of claim 7 wherein GMRP configuration is performed on a per port basis as well as a global basis.

9. An apparatus comprising:

a first set of ports to receive network traffic;

a second set of ports to transmit network traffic;

a memory coupled with the first set of ports and the second set of ports, the memory to store information related to network traffic; and a processor coupled with the memory, the first set of ports and the second set of ports, the processor to process a first set of multicast registrations according to Internet Group Management Protocol (IGMP) and to process a second set of multicast registrations according to GARP (Generic Attribute Registration Protocol) Multicast Registration Protocol (GMRP), wherein static multicast registrations are processed with a highest priority, dynamic IGMP multicast registrations are processed with a second highest priority as static GMRP registrations are processed with a third highest priority and default registrations are processed with a fourth highest priority.

10. The apparatus of claim 9 wherein the IGMP registrations are not propagated via GMRP to GMRP aware devices.

* * * * *

UNITED STATES PATENT AND TRADEMARK OFFICE
CERTIFICATE OF CORRECTION

PATENT NO. : 6,785,294 B1
DATED : August 31, 2004
INVENTOR(S) : Ammitzbøll et al.

It is certified that error appears in the above-identified patent and that said Letters Patent is hereby corrected as shown below:

Column 4,
Line 38, after "priority" insert -- than --.
Line 39, delete "punning" and insert -- pruning --.

Signed and Sealed this

Twenty-fifth Day of January, 2005

JON W. DUDAS
*Director of the United States Patent and Trademark Office*